Feb. 2, 1932. W. J. YOUNG 1,843,259

INDICATOR

Filed Oct. 4, 1930

Inventor
William J. Young
By Faust & Crampton
Attorney

Patented Feb. 2, 1932

1,843,259

UNITED STATES PATENT OFFICE

WILLIAM J. YOUNG, OF MONROE, MICHIGAN

INDICATOR

Application filed October 4, 1930. Serial No. 486,299.

My invention has for its object to provide a means for indicating deflation of a pneumatic tire of a vehicle, such as an automobile, which usually takes place over a period of use of the vehicle and which other than by using such indicator as tire gauges is not ascertainable. As is well known, the relative wear and efficiency of pneumatic tires depends largely on the maintenance of their proper inflation at all times. My invention has also for its object to provide an automatic indicator which requires no attention of the user and which can be installed at a relatively low cost, and one that will announce deflation below a desired point.

The invention may be contained in indicators that vary in their details and, to illustrate a practical application of the invention, I have selected an indicator containing my invention as an example of the various embodiments of my invention, and shall describe it hereinafter. The particular structure selected as an example is shown in the accompanying drawings.

Figure 1:
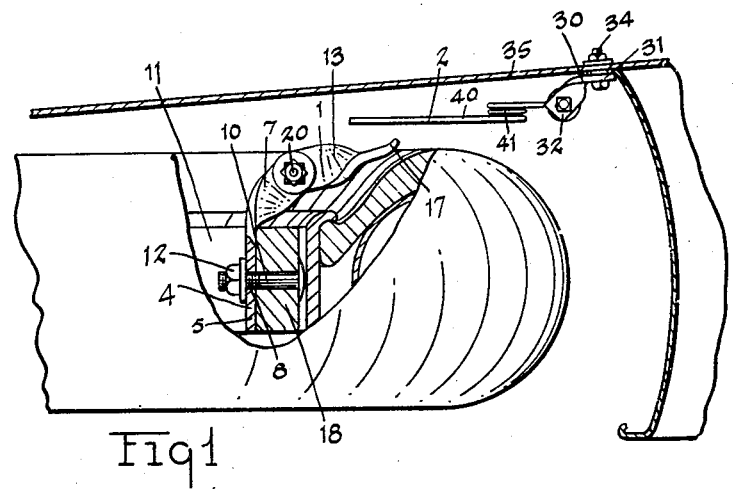
Figure 2:
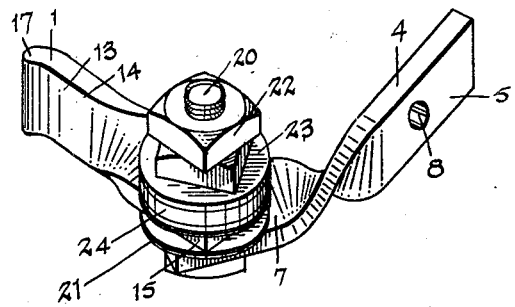
Figure 3:
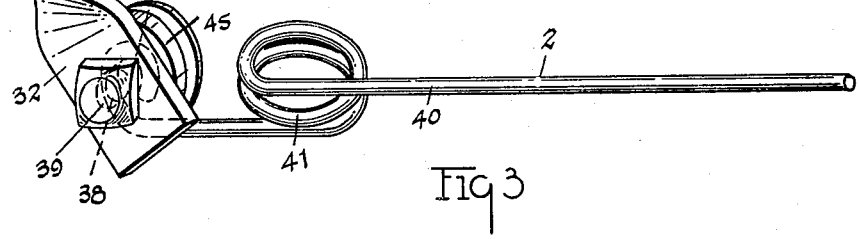

Fig. 1 illustrates a view on the horizontal plane of the axle showing a portion of the tire broken away to illustrate the installed position of the indicator. Fig. 2 illustrates one part of the indicator. Fig. 3 illustrates another part of the indicator.

The indicator chosen for purposes of illustration has a striker part 1 which may be located on the tire and which serves to vibrate a sounding part 2 when the tire has become partially deflated. The striker part 1 continues to vibrate part 2 until the tire has been re-inflated. The part 1 of the indicator is composed of a bracket member 4 having flattened end portions 5 and 7. The flattened end portion 7 is located at right angles to the plane of the surface of the flattened end portion 5. The flattened end portion 5 has an opening 8, substantially the size of the bolt 10 which may be located in the rim 18 of the vehicle wheel 11. The bracket member is held in place on the rim 18 by the bolt 10 and its washer and nut 12. The other flattened end portion 7 of the bracket member supports a finger member 13. The finger member 13 has flattened end portions 14 and 15, the flattened end portion 15 being at right angles to the plane of the surface of the flattened end portion 14. The finger member is connected to the bracket member by a bolt 20 which passes through an opening 9 in the bracket member 4 and an opening 16 in the finger member. In order to allow for pivotal movement of the finger relative to the bracket member and ready adjustment of one relative to the other, a series of washers 21 may be placed between the flattened end portion 7 of the bracket member and the flattened end portion 15 of the finger member. The finger member and the bracket member are held in their relative positions by nuts 22 and a metal washer 23 which yieldingly press the flat portions of the two members together. In order to insure a cushioning pressure, a cushioning washer 24 may be inserted between the metal washer 23 and the flat portion 15 of the finger member. The washer 24 may be formed of such material as rubber or cloth. It will be seen, therefore, that the finger member may be moved angularly relative to the bracket member when a predetermined force is applied to the finger member to overcome the yielding pressure with which the finger member is held. The flattened end portion 14 of the finger member may have rounded corners and beveled edges 17 to eliminate the danger of cutting the tire and to allow the finger member to pass easily over the part 2.

The part 2 of the indicator, likewise, has a bracket member 30 having two flattened end portions 31 and 32, the flattened end portion 32 being located at right angles to the plane of the flattened end portion 31. The end portion 31 has an opening 33 for receiving a bolt 34 which extends through a part of the body or frame of the automobile, such as mud guard 35, and is held in place there by the nut and washer 36. The opposite end portion 32 of the bracket 30 has an opening 38 for receiving the bolt 39. The bolt 39 supports an arm 40. The resilient arm 40 may be formed of resilient material, such as spring wire, and has a spiral portion 41. The spiral portion 41 adds to the resiliency of the arm and will prevent permanent bending of the arm as it is struck by the part 1. The resilient member is connected to the bracket member by the bolt 39 which extends through the opening 38 in the bracket member and through a hook 42 form in one end of the resilient member. In order to yieldingly hold the resilient member in position, fibrous washers 45 may be placed between the hook 42 and the flattened end portion 32 of the bracket 30.

It will be seen that, as the pneumatic tire becomes deflated through general use or slow leaks of various kinds, the side walls of the tire will be spread by the weight of the vehicle and the edges of the tire will cause the finger to be moved outwardly away from the tire. As the finger member moves with the wheel, it will meet the resilient arm and will cause the resilient member to sound, thereby giving warning to the driver that the tire has become deflated and requires attention. The sounding of the resilient arm will continue until the tire is refilled. The resilient member may be adjusted by the bolt 39 to assume any angle relative to the tire so as to be sounded at any degree of deflation of the tire.

I claim:

In combination with a vehicular pneumatic tire and wheel, an indicator comprising a spring having an arm, a bracket for supporting the spring on the vehicle body, a finger member, a second bracket attached to the rim of the wheel for pivotally supporting the finger member against the side of the tire, a plurality of frictional washers located between the second bracket and the finger member for resistingly holding the finger member against movement other than the positive spreading movement of the tire produced by the weight of the vehicle when the tire is deflated.

In witness whereof I have hereunto signed my name to this specification.

WILLIAM J. YOUNG.